Figure 1:
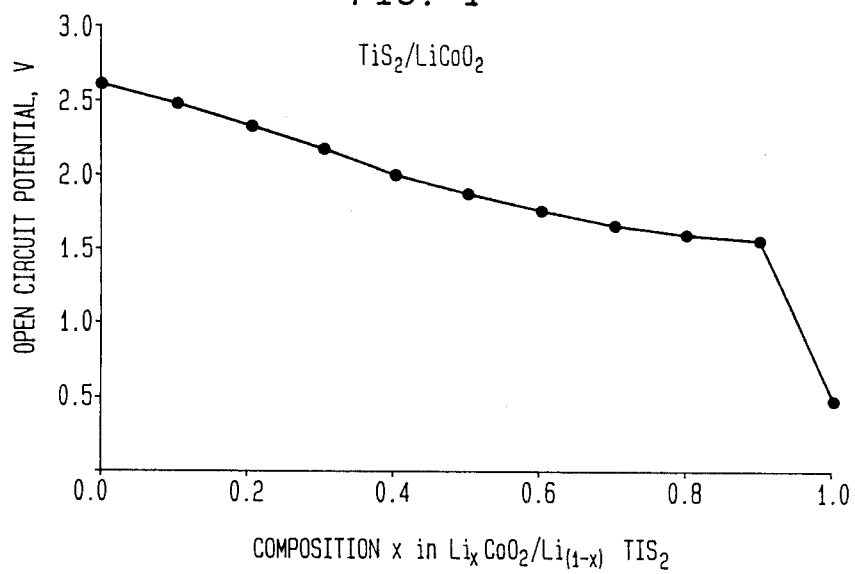

United States Patent [19]

Slane et al.

[11] Patent Number: 4,983,476
[45] Date of Patent: Jan. 8, 1991

[54] RECHARGEABLE LITHIUM BATTERY SYSTEM

[75] Inventors: Steven M. Slane, Neptune; Edward J. Plichta, Howell, both of N.J.

[73] Assignee: The United States of America as represented by the Secretary of the Army, Washington, D.C.

[21] Appl. No.: 539,960

[22] Filed: Jun. 18, 1990

[51] Int. Cl.⁵ .............................................. H01M 6/18
[52] U.S. Cl. ...................................... 429/197; 429/218
[58] Field of Search ............... 429/194, 196, 197, 218

[56] References Cited

U.S. PATENT DOCUMENTS

| | | | |
|---|---|---|---|
| 4,710,439 | 12/1987 | Tarascon | 429/218 X |
| 4,770,960 | 9/1988 | Nagaura et al. | 429/194 |
| 4,804,596 | 2/1989 | Ebner et al. | 429/197 X |
| 4,818,647 | 4/1989 | Plichta et al. | 429/218 |
| 4,863,817 | 9/1989 | Ogino et al. | 429/194 |

Primary Examiner—Anthony Skapars
Attorney, Agent, or Firm—Michael Zelenka; Roy E. Gordon

[57] ABSTRACT

A new rechargeable lithium battery system is provided that contains no metallic lithium; the system including a transition metal sulfide anode, a lithiated transition metal oxide cathode, and a solution of a lithium salt in an aprotic organic solvent as the electrolte.

11 Claims, 1 Drawing Sheet

RECHARGEABLE LITHIUM BATTERY SYSTEM

The invention described herein may be manufactured, used, and licensed by or for the Government for governmental purposes without the payment to us of any royalty thereon.

This invention relates in general to a rechargeable lithium battery system and in particular to such a system comprising a transition metal sulfide anode, a lithiated transition metal oxide cathode, and a solution of a lithium salt in an aprotic organic solvent as the electrolyte.

BACKGROUND OF THE INVENTION

The class of lithium intercalating transition metal oxides and transition metal sulfides are particularly attractive for battery applications because of their inherently high energy content. However, the known lithium/oxide and lithium/sulfide combinations have lithium anodes that are subject to reaction with the solvent and electrolyte. The reactions result in losses in cell capacity and cycle life. Also, metallic lithium is a very energetic and unstable material that is a possible safety hazard in cells that short circuit or are abused.

SUMMARY OF THE INVENTION

The general object of this invention is to provide a rechargeable lithium battery system that contains no metallic lithium. A more particular object of the invention is to provide such a system that is a safe power source with good low temperature performance, good rate capabilities and cycle life, stability and low cost. Another object of the invention is to provide such a system that will be used in batteries for electronic and communication equipment as well as general portable devices requiring battery power sources. A still further object of the invention is to provide such a system that has applications to pulse power and use as an ionic capacitor.

It has now been found that the aforementioned objects can be attained by providing a rechargeable lithium battery system including a transition metal sulfide anode, a lithiated transition metal oxide cathode, and a solution of a lithium salt in an aprotic organic solvent as the electrolyte.

DESCRIPTION OF THE DRAWING AND THE PREFERRED EMBODIMENT

FIG. 1 represents the thermodynamic potential of the $TiS_2/LiCoO_2$ couple as a function of lithium content. The plot is based on the Gibbs Free Energy of formation. In the plot, the ordinate is the open circuit potential in volts and the abscissa is the Composition x in $Li_xCoO_2/Li_{1-x}TiS_2$.

Figure 2:
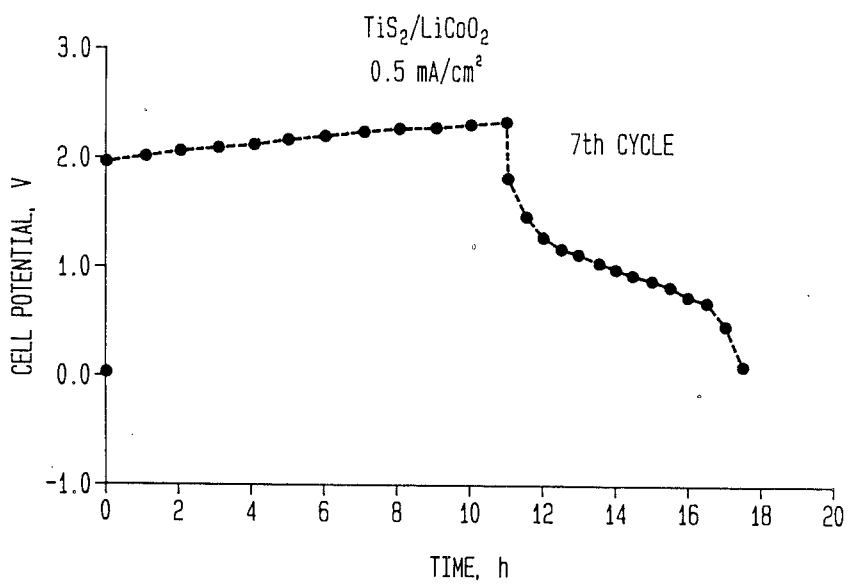

FIG. 2 illustrates the seventh charge/discharge cycle experimentally obtained for a $TiS_2/LiCoO_2$ couple at a current density of $0.5mA/cm^2$ wherein the ordinate is the cell potential in volts and the abscissa in the time in hours.

It has been found that a $TiS_2/LiCoO_2$ anode/cathode couple in an aprotic organic solvent can produce desired results. A typical electrode fabrication procedure with these materials is as follows: An electrode mix of 85 weight percent active material, $TiS_2$ or $LiCoO_2$, 20 percent weight of a conductive diluent such as Vulcan XC-72, and 5 weight percent of a binder such as Teflon is prepared. The weight percent of active material may range from 60 to 95 percent. The weight percent of conductive diluent may range from 0 to 30 percent and the weight percent of binder may range from 1 to 15 percent. Other conductive diluents such as Shawinigan Acetylene Black, graphites or other conductive materials may be used. In addition, other binders such as polyolefins or elastomers may be substituted for Teflon. The electrode mix is rolled onto a nickel or aluminum screen or foil.

The electrolyte for the cell demonstrated in FIG. 2 is 1.56 mol $dm^{-3}$ $LiAsF_6$ in methyl acetate. Other aprotic organic solvents such as methyl formate, propylene carbonate, dimethyl carbonate, diethyl carbonate, dimethoxy ethane, tetrahydrafuran and mixtures thereof can be used. In addition, other lithium salts can be used such as $LiAlCl_4$, $LiClO_4$ or $LiBF_4$.

The $TiS_2/LiCoO_2$ cell has a theoretical energy density of 234 Wh/kg at 1.83 volts (assuming 1 F/mole or 100 percent electrode utilization). This is demonstrated in FIG. 1. The open circuit voltage of this electrode combination is nearly 0 volts. To achieve a usable potential difference, the $LiCoO_2$ is electrochemically oxidized while the $TiS_2$ is reduced. Lithium ions, (x) leave the Li $CoO_2$ increasing its potential and intercalate into the $Li_{(1-x)}TiS_2$ decreasing its potential. FIG. 2 demonstrates the charge/discharge of the $LiCoO_2$ cathode versus $TiS_2$ in 1.56 mol $dm^{-3}$ $LiAsF_6$ in methyl acetate. For the seventh cycle between the voltages of 2.25 and 0.05 volts, the cell produces an energy density of 20 Wh/kg with an average discharge potential of 0.9 volts at a current density of $0.5mA/cm^2$.

This cell achieves 10 full charge/discharge cycles before being stopped.

Other lithium intercalating transition metal sulfide materials can be used as the anode in lieu of $TiS_2$ such as $VS_2$, $CdS_2$, $NbS_2$, $CrS_2$, $MoS_2$, $WS_2$, $FeS_2$ and $NiS_2$.

Other lithiated transition metal oxide material can be used as the cathode in lieu of $LiCoO_2$ such as $LiFeO_2$, $LiMnO_2$, and $LiCrO_2$.

A battery system of a sulfide anode and a lithiated oxide cathode with no metallic lithium offers advantages over currently available lithium rechargeable cells. That is, lithium battery chemistries that use either solvents such as those based on tetrahydrafuran do not have a high enough resistance to oxidation at the high potentials of the transition metal oxide cathode materials. The use of esters such as methyl acetate and methyl formate provide high conductivities, but perform poorly as electrolyte solutions in lithium cells. This new sulfide/oxide battery system enables the use of ester or ether solvents, or mixtures thereof due to the lack of metallic lithium present in the system.

The use of a battery system using $TiS_2$ as the anode and $LiCoO_2$ as the cathode combines the desirable rate capabilities of each of these materials with regard to lithium intercalations without a lithium electrode. $Li/TiS_2$ in ether-based electrolytes and $Li/LiCoO_2$ in ester-based electrolytes both can handle moderate to high rates of $1-5mA/cm^2$. However, both systems degrade with time upon charge and recharge and both contain excess lithium which is unsafe. A $TiS_2/LiCoO_2$ anode/cathode combination in an organic solvent electrolyte utilizes about 0.5 mole of lithium of the 1.0 mole of lithium found in the $LiCoO_2$ cathode material. This combination results in a safe and efficient combination capable of handling high current densities.

We wish it to be understood that we do not desire to be limited to the exact details of construction shown and

What is claimed is:

1. A rechargeable lithium battery system that contains no metallic lithium said system comprising a transition metal sulfide anode, a lithiated transition metal oxide cathode, and a solution of a lithium salt in an aprotic organic solvent as the electrolyte.

2. A rechargeable lithium battery system according to claim 1 wherein the transition metal sulfide anode is selected from the group consisting of $TiS_2$, $VS_2$, $CdS_2NbS_2$, $CrS_2$, $MoS_2$, $WS_2$, $FeS_2$ and $NiS_2$.

3. A rechargeable lithium battery system according to claim 2 wherein the transition metal sulfide is $TiS_2$.

4. A rechargeable lithium battery system according to claim 1 wherein the lithiated transition metal oxide cathode is selected from the group consisting of $LiCoO_2$, $LiFeO_2$, $LiMnO_2$, and $LiCrO_2$.

5. A rechargeable lithium battery system according to claim 4 wherein the lithiated transition metal oxide cathode is $LiCoO_2$.

6. A rechargeable lithium battery system according to claim 1 wherein the lithium salt in the electrolyte is selected from the group consisting of $LiAlCl_4$, $LiClO_4$, $LiBF_4$, and $LiAsF_6$.

7. A rechargeable lithium battery system according to claim 6 wherein the lithium salt in the electrolyte is $LiAsF_6$.

8. A rechargeable lithium battery system according to claim 1 wherein the aprotic organic solvent of the electrolyte is selected from the group consisting of an ether solvent, a mixture of ether solvents, an ester solvent, and a mixture of ester solvents.

9. A rechargeable lithium battery system according to claim 8 wherein the aprotic organic solvent is selected from the group consisting of methyl acetate, methyl formate, propylene carbonate, dimethyl carbonate, diethyl carbonate, dimethoxyethane, tetrahydrafuran and mixtures thereof.

10. A rechargeable lithium battery system according to claim 9 wherein the aprotic organic solvent is methyl acetate.

11. A rechargeable lithium battery system that contains no metallic lithium, said system comprising $TiS_2$ as the anode, $LlCoO_2$ as the cathode, and a solution of 1.56 mol $dm^{-3}$ $LiAsF_6$ in methyl acetate as the electrolyte.

* * * * *